United States Patent [19]

La

[11] 4,237,990
[45] Dec. 9, 1980

[54] OMNIDIRECTIONAL VEHICLE

[76] Inventor: Hau T. La, P.O. Box 12398, Gainesville, Fla. 32601

[21] Appl. No.: 570

[22] Filed: Jan. 2, 1979

[51] Int. Cl.$^3$ .................. B60B 19/00; B62D 57/00
[52] U.S. Cl. ............................ 180/7 R; 180/21; 180/212
[58] Field of Search ............. 180/7 R, 7 A, 21, 6.5, 180/79, 210, 212, 213, 214; 301/5 P, 5 R

[56] References Cited

U.S. PATENT DOCUMENTS

| 3,016,966 | 1/1962 | Hansen | 180/7 R |
|-----------|--------|--------|---------|
| 3,295,700 | 6/1967 | Ziegler | 180/7 R X |
| 3,570,615 | 3/1971 | Guilbaud | 180/6.5 X |
| 3,746,112 | 7/1973 | Ilon | 180/7 A |
| 3,876,255 | 4/1975 | Ilon | 301/5 R |

Primary Examiner—John A. Pekar
Attorney, Agent, or Firm—Arthur G. Yeager

[57] ABSTRACT

A wheeled vehicle provided with three individually driven wheels rotatable on horizontal axes. The wheels are disposed at the corners of a triangle. The periphery of each wheel is defined by a plurality of rollers rotatable on respective axes which are each at an angle to the axis of the respective wheel. The axes of three rollers, one for each wheel, when each such roller is in its lowermost position, form a triangle. Each roller axis may be at right angles or perpendicular to, or at 45 degrees to, or at some other acute angle to the respective wheel axis, and the triangle may be an equilateral triangle in a typical embodiment of the invention.

According to a preferred embodiment of the invention, no two of the wheel axes are aligned or parallel to each other. In a typical construction, the wheels are at the corners of an equilateral triangle and the wheel axes intersect at the center of this triangle. The vehicle may be driven over a surface, or it may be inverted and an object with a surface engaged on the wheel rollers may be moved with respect to the stationary "vehicle". Controls for motors driving the wheels of the vehicle are provided to produce rectilinear movement, rotational movement or curvilinear movement of the vehicle over the surface.

41 Claims, 14 Drawing Figures

U.S. Patent   Dec. 9, 1980   Sheet 1 of 5   4,237,990
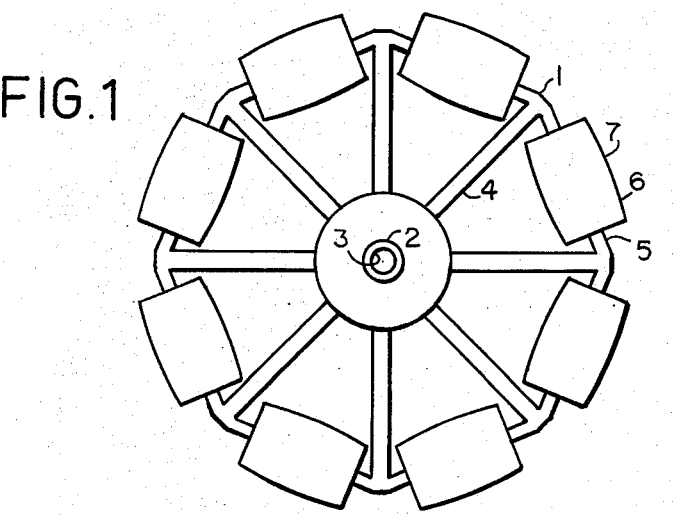
FIG.1   FIG.2
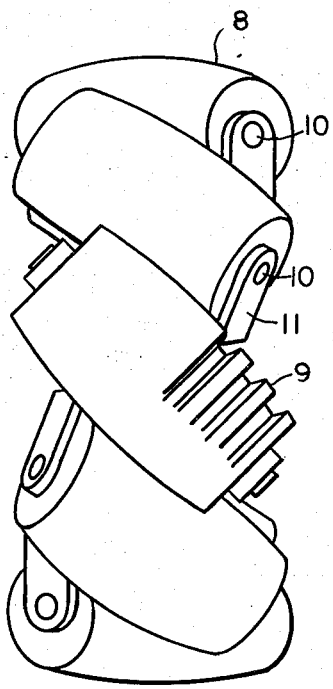
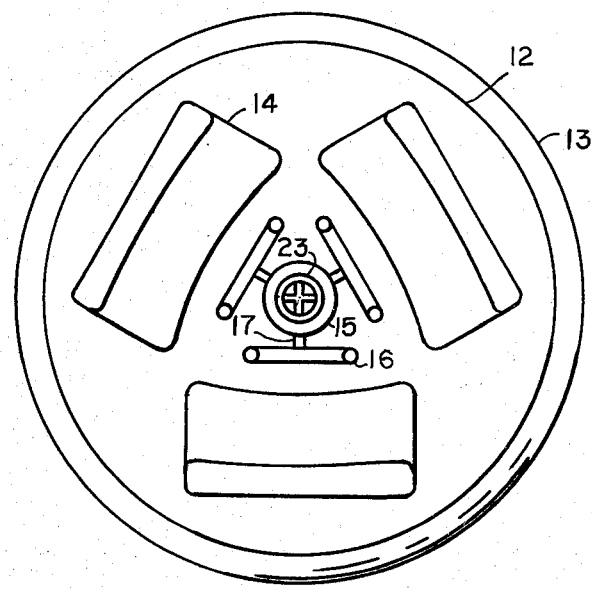
FIG.3
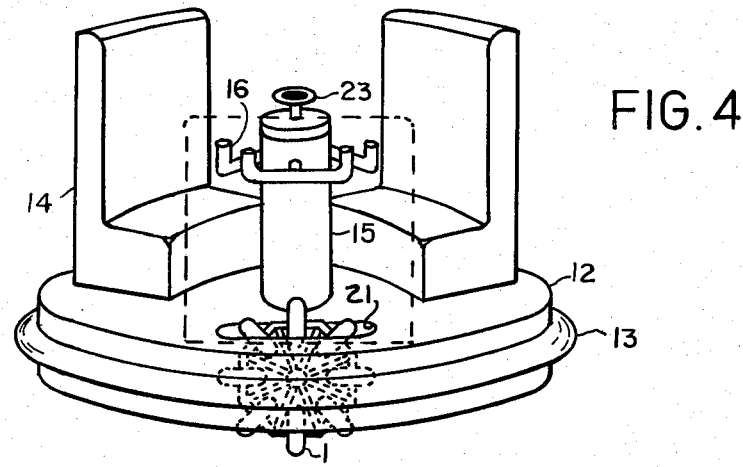
FIG.4

OMNIDIRECTIONAL VEHICLE

SUMMARY OF THE INVENTION

The invention relates to a three-wheeled vehicle wherein each wheel is independently driven, typically by an electric motor, each wheel of the vehicle being provided with peripheral rollers rotatable about axes at an acute angle with respect to the respective wheel axis.

In a preferred embodiment, the three wheels are arranged at the corners of an equilateral triangle, the wheel axes intersect at the center of the triangle, each wheel is driven by a respective variable speed electric motor, and the roller axes are at right angles to the respective wheel axis. Wheels having rollers with roller axes so oriented are shown in Blumrich U.S. Pat. No. 3,789,947; Dalrymple U.S. Pat. No. 3,253,632; and in Grabowiecki U.S. Pat. No. 1,305,535. Alternatively, wheels as shown in U.S. Pat. No. 3,876,255,—Ilon wherein there are rollers with axes at 45 degrees to the wheel axis may be employed. An Ilon wheel will result in smoother travel of the vehicle, while greater facility of movement in certain directions may be afforded by Blumrich type wheels. Reference is also had to German Patent No. 300247 of 1917 showing a castored wheel of the Blumrich type, and to Canadian Patent No. 475,792 showing similar wheels. German Patent No. 822,660 of 1951 and U.S. Pat. No. 3,295,700 to Ziegler show double wheels comprising two sets of peripheral rollers arranged to provide the smooth motion characteristic of Ilon wheels, and, since the roller axes are perpendicular to the wheel axes, the greater freedom of movement characteristic of the present vehicle when equipped with Blumrich type wheels.

Further patents disclosing wheels having peripherally arranged rollers include Guinot U.S. Pat. No 3,465,843 and Ilon U.S. Pat. No. 3,746,112. Kusmer U.S. Pat. No. 3,420,326 shows a vehicle capable of movement in four directions. Guilbaud U.S. Pat. No. 3,570,615 shows a vehicle equipped with any number of individually driven wheels, which might include three wheels, and control means for correlating the rotational speeds of the driving motors for individual respective wheels.

It is a distinguishing characteristic of the present invention that there be three wheels disposed at the corners of a triangle, that one of the wheels have an axis which is at an angle to the axis of another one of the wheels, and that the roller axes form a triangle, taking the axis of a roller of each wheel when such axis is parallel to the surface engaged by the rollers.

A three wheeled vehicle according to the invention may take the form of a passenger carrying vehicle which may be controlled to rotate about some point either within or outside of the triangle defined by the centers of the three wheels, or to follow a rectilinear or curvilinear path in any desired direction, and which may be controlled to rotate or to travel without rotation along such curvilinear or rectilinear path. Such vehicle may be used as an amusement bumper car, or, for example, as a protectively shielded vehicle for moving about in a hot cell as suggested by Ziegler.

The vehicle may also take the form of a remotely controlled toy or a remotely controlled game piece for moving along paths or into spaces on a game board, for example.

According to a specific embodiment, a vehicle according to the invention may serve as a wheel chair for a physically handicapped person.

A three-wheeled vehicle according to the invention has the properties of (1) true omnidirectionality: movable in any direction and rotatable about any point on the surface without any sliding on the surface; (2) directional stability: for any given set of wheel rotational speeds and directions, there exists only one possible vehicle motion; and (3) no possible conflict between wheels: for every arbitrary set of wheel rotational speeds and directions, there exists a corresponding possible motion of the vehicle.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a front elevational view of a wheel for a vehicle in accord with the invention;

FIG. 2 is a side elevational view of a modified wheel for a vehicle in accord with the invention;

FIG. 3 is a top plan view of a bumper car in accord with one aspect of the invention;

FIG. 4 is a perspective view of the car of FIG. 3 a portion being broken away and shown partially in phantom;

Figure 5:
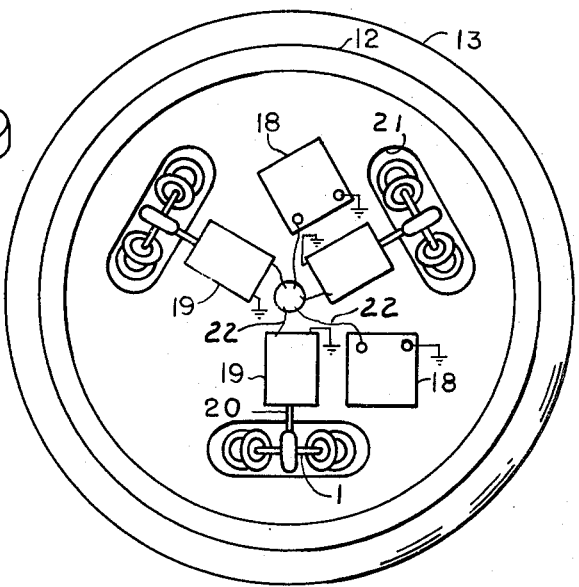
FIG. 5 is a bottom view of the car of FIGS. 3 and 4, certain parts being schematically represented.

Referring now to the drawings, FIG. 1 shows a wheel 1 having a hub 2 bored at 3 to receive an axle for driving the wheel. A plurality of radiating spokes 4 support and are connected by roller journal members 5. A respective roller 6 is freely rotatably mounted on each journal member 5 on an axis which is perpendicular to the axis of rotation of the wheel with its driving axle. The rollers 6, like those of Blumrich U.S. Pat. No. 3,789,947, have arcuate or convexly vaulted surfaces 7 conforming substantially to segments of a circle having a radius equal to the distance from the wheel axis to the outwardly disposed surface portion of a roller, but, unlike Blumrich, each roller is freely rotatable on its respective journal.

As a wheel 1 rotates about its axis, depending upon the distance between each roller and the next along the outer periphery defined by the roller surfaces, there will be some bouncing as the wheel rolls from one roller to the next. The rollers may be of rubber or the like, to provide the desired traction and to provide resilient damping or softening of the bounces. A large number of rollers will, of course, permit closer spacing of the rollers but ordinarily at greater expense of construction.

Figure 6:
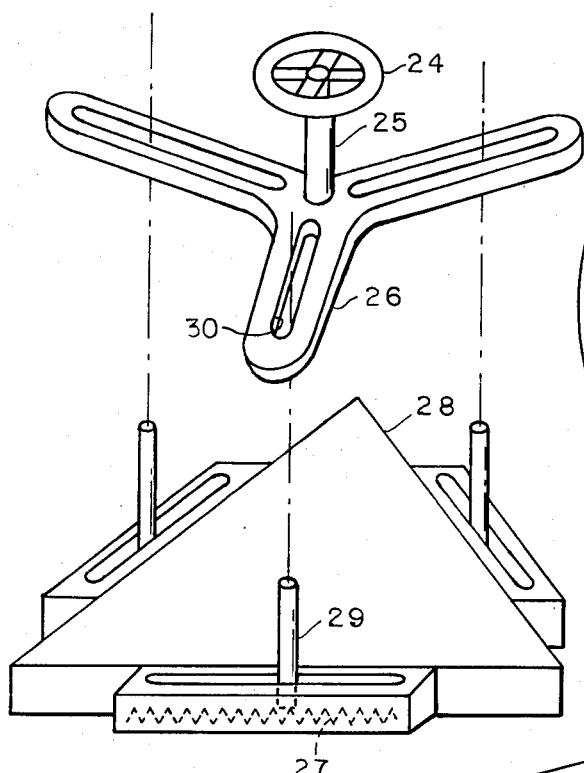
FIG. 6 is an exploded perspective view of a simple control mechanism in accord with the invention.
Figure 7:
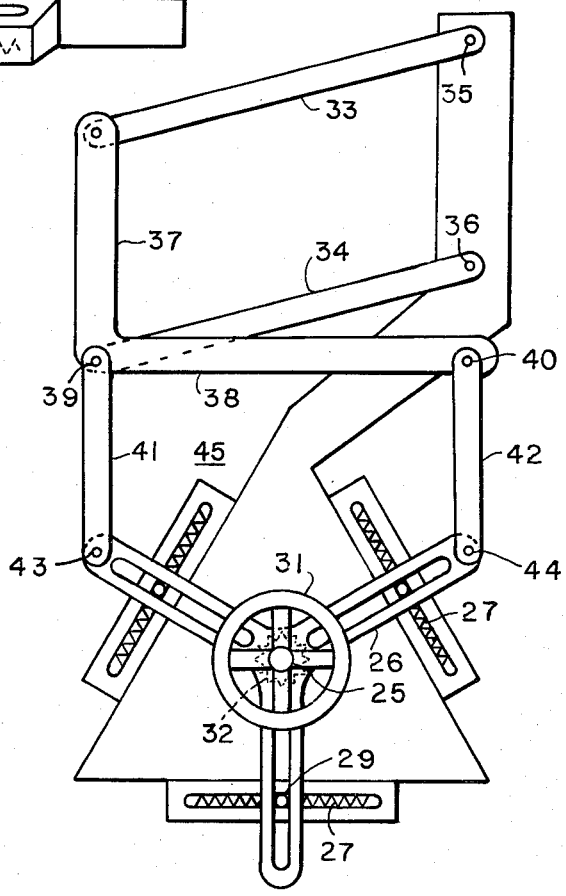
FIG. 7 is a top plan view of a modified control mechanism in accord with the invention.

There are two arrangements which have been suggested to minimize bounce in rotating wheels with roller peripheries. One such arrangement involves the use of two side-by-side wheels 1 on each axle, with the rollers of one being offset from the rollers of the other. A double wheel of this type which may be used in the present invention is shown in FIGS. 6 and 7 of the above Ziegler U.S. Pat. No. 3,295,700.

An alternative substantially smooth rolling or bounceless wheel is shown in side view in FIG. 2, comprising rollers 8 with convexly vaulted ground-engaging surfaces 9 and rotatable on respective journal members 10. The journal members 10 are supported from a hub (not shown) by spokes 11, with the journal axes oriented as seen in FIG. 2, at substantially 45 degrees with respect to the rotational axis of the wheel. Wheels comprising peripheral rollers so arranged provide that as each roller leaves the ground, or other supporting surface, the next roller has come into supporting contact therewith. The angle between the wheel axis and the journal axis of each roller may be, theoretically, any angle other than 0 or 180 degrees, and, in practice, might be any angle between, for example, about 30 and 60 degrees. A wheel of the type of FIG. 2 may, accordingly, be as shown and described in the above Ilon U.S. Pat. No. 3,876,255. To avoid irregular changes of course, the angular displacement between the roller axes and the wheel axis should be the same for any one wheel.

FIGS. 3 and 4 show a bumper car for an amusement park comprising a circular platform or body 12 surrounded by a resilient bumper ring 13 which may contact the bumper rings of other like cars and may contact the retaining wall which normally surrounds the stage or floor on which bumper cars operate. Three inwardly facing seats 14 are provided on the platform for carrying three drivers. A central post 15 mounted at the center of the platform carries three individually moveable manual control handles 16, which are shown as of handlebar configuration. The shaft 17 of each control handle is rotatably supported by the post, and within the post is a respective potentiometer comprising an electrical resistance element and a cooperating sliding contact connected to the shaft 17 for each handle 16. The potentiometers being of any conventional construction, such are omitted from FIGS. 3 and 4 for the sake of clarity.

Referring to FIGS. 4 and 5, mounted under the platform 12 are two batteries 18, three variable speed, reversible d.c. motors 19 and three roller periphery wheels 1, each represented generally schematically in the drawings. Each wheel is mounted on the shaft 20 of a respective motor 19, each shaft serving as the axle for a respective wheel. The platform may include three apertures as shown at 21 to provide clearance for each of the wheels, each wheel extending up through a respective aperture into hollow space within a respective seat 14 disposed above the aperture. Electrical wiring indicated generally at 22 from the batteries extends upwardly into the post for connection to the three potentiometer resistance elements and from the potentiometer slider to each of the motors 19. The positive terminal of one battery and the negative terminal of the other are grounded, as is one terminal of each motor.

It is contemplated that each handle 16 will control a respective one of the three motors, in both speed and direction. In that each of the three drivers has independent control of one motor, the net result when one driver moves his handlebar cannot be anticipated by any one of them, and even if two drivers seek to coordinate and cause movement in a particular direction, the third is able to completely thwart their plans.

A simple control system which is adapted to use in a bumper car is shown schematically in FIG. 8 hereinafter described.

In addition to the three potentiometers controlled by the three handles as above described, there may be a centrally disposed wheel 23 rotatably mounted on and extending above post 15 and controlling the sliding contact of a conventional rotary potentiometer, with an arcuate resistance element, such potentiometer being disposed within the post but being omitted from the drawings for clarity. This additional potentiometer may be connected to add or subtract from the voltages applied to the motors in a manner to add components thereto which result in rotational components of vehicle movement as hereinafter described. If the center wheel 23 and its potentiometer are included, there is the further opportunity for any one of the drivers to reach out and start or change the rotational component of movement of the car.

While wheels of the type of FIG. 1 are shown with the vehicle of FIGS. 3–5, wheels of the type of FIG. 2 may be substituted, or double wheels as shown in the Ziegler patent may be employed.

Rather than to provide the three seats of the vehicle of FIGS. 3–5, all except one of the seats may be omitted and one coordinated control such as shown in FIG. 6, or such as shown in FIG. 7, may be substituted to provide ready control of the vehicle in desired directions.

According to FIG. 6, the wheel or handle 24 may be moved in the direction in which movement of the vehicle is desired, the speed being proportional to the lateral displacement of the wheel and its integral mounting shaft 25 from the center position. Rotation of the wheel will further result in proportional rotative motion of the vehicle.

It will be seen that three control arms 26 are fixed to and extend horizontally from the shaft 25, the arms being disposed at angles of 120 degrees each to the next, assuming that the three roller periphery wheels are disposed at the corners of an equilateral triangle and that the wheel axes intersect at a point presumably at or near the center of gravity of the vehicle. Three resistance elements 27 are provided mounted along the respective sides of an equilateral triangular base 28 which is fixed to the body.

Each resistance element is desirably oriented parallel to a respective one of the wheels of the vehicle. A sliding contact, which includes an upstanding rod 29, is provided for each resistance element 27, the rods extending into slots 30 in the respective arms. The arrangement is such that, in response to lateral movement of the wheel 24, shaft 25 and arms 26 in the direction of one of the arms and without any rotation of the wheel, shaft and arms, the rod engaged in the slot of that arm is not moved, whereas the rods engaged in the slots in the other two arms converge equally or diverge equally, depending upon the direction in which the control is moved, thus to slide these two contacts along the respective resistors. The result will be that the two wheels corresponding to those two resistors will rotate in directions to drive the vehicle in the direction in which the wheel, shaft and arms where displaced. In a similar manner, displacement of the manual control assembly, consisting of the wheel, shaft and arms, in any rectilinear direction from a center position will result in rectilinear movement of the vehicle in that direction. If, at the same time that the wheel is displaced laterally from a neutral center position, the wheel is rotated to right or left, the vehicle will travel along a corresponding curved path, or, if the control is in center position, and the wheel is then rotated without being moved laterally, the vehicle will rotate about the center of its base triangle defined by the centers of the three roller periphery wheels.

If the vehicle wheels were not arranged at the corners of an equilateral triangle but were disposed at the corners of an irregular triangle, or if their axes did not intersect at a single point, the geometry of the control as shown in FIG. 6 may be modified to conform to the wheel geometry whereby control movements of the wheel 24, laterally or rotationally, provide conforming changes in the velocity and direction of vehicle movements. In most applications, it will be preferred, however, that the wheels be disposed at the corners of an equilateral triangle with axes intersecting at a point at the center of the triangle. If on the other hand the vehicle is intended to travel primarily in one direction, the angle between two of the wheel axes may be increased, such as to 180 degrees, to increase directional stability of the vehicle in such primary directions, including the reverse direction, while still permitting rotation or travel in any other direction, such as directions at right angles to such primary direction.

In the simplest control system, in the bumper car of FIGS. 3–5, for example, each of the rods 29 of FIG. 6 may be individually movable by a respective one of the handles 16, the shaft 25, wheel 24 and arms 26 being then omitted. The batteries 18 are connected in series across each resistor 27, with the center connection grounded. One terminal of each motor being grounded and the other connected to the slider, a positive or negative voltage is applied to the respective motor as the corresponding rod 29 is moved in one or the other direction from the midpoint of the resistor, thereby to cause motor operation at variable speeds in corresponding forward and reverse directions.

A coordinated vehicle control is shown in FIG. 7 comprising a manually engageable wheel 31 rotatably mounted with respect to arms 26 through a shaft 25, and bodily movable in lateral directions with arms 26. An arcuate resistance element 32 is swept by a sliding contact (not shown) which is operatively attached to turn with the wheel 31. The voltage appearing on the contact is added to each of the voltages appearing on the sliders controlled by the rods 29 to impart a rotative component to the motion of the vehicle. It will be understood that the added voltage may be positive or negative in sign, and may, accordingly, increase or decrease voltages of positive or negative sign appearing on the sliders on the linear resistors 27. Thus if all of the rods 29 are centered, rotation of the wheel 31 in one direction from a centered rotational position thereof will cause vehicle rotation in a corresponding direction.

A four bar linkage is shown in FIG. 7 comprising parallel bars 33 and 34 having pivot points 35 and 36 fixed with respect to the base 28 at one end of the bars and being pivotally attached to a link 37 at the other end. Link 37 is integral with an arm portion 38, and this arm portion is thus constrained to maintain a predetermined orientation with respect to the base. The link arm portion may, typically, extend laterally across in front of the driver of the vehicle. Arm portion 38 has pivot connections at 39 and 40 with two equal length links 41 and 42 and constitutes a bar of a second four bar linkage 45. Links 41 and 42 extend in parallel directions to pivots 43 and 44, which join the links to end portions of two of arms 26, the pivots 43 and 44 being equidistant from the center of wheel 31. The two of arms 26 which carry pivots 43 and 44 thus also constitute a bar of the second four bar linkage 45, which linkage is completed by the links 41 and 42 constituting the side bars thereof.

The linkages as described permit free lateral displacement of shaft 25 and of the three interconnected arms 26 integral therewith in any horizontal direction but prevent any rotation of the arms about the axis of shaft 25 and wheel 31. Accordingly, so long as wheel 31 remains in its neutral or centered rotational position, lateral movement of the wheel and arms results in adding rectilinear components of motion to the vehicle while the driver remains facing in the same direction.

It is to be noted that, while in FIG. 6 rotation of wheel 24 causes the arms 26, which are rigidly interconnected and rigidly connected to the wheel 24 through shaft 25, to rotate about the axis of the wheel and shaft (which may, at the same time be at a position laterally displaced from a central position), the linkage arrangement of FIG. 7 prevents any rotation of the arms, and the rotation of wheel 31 is independent of the arms.

Figure 8:
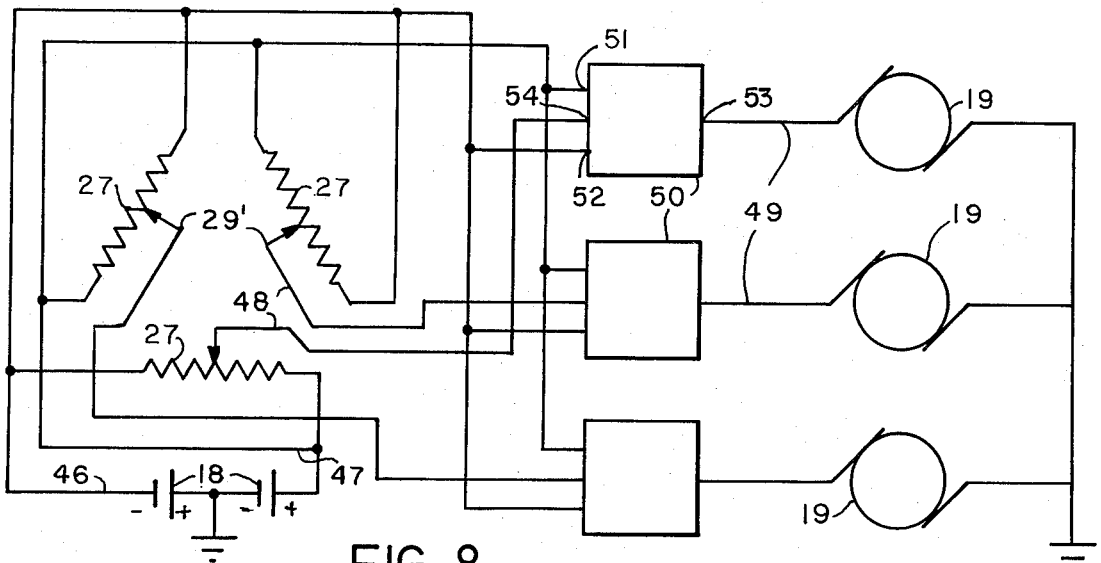
FIG. 8 is a schematic diagram of a control system applicable to the mechanism of FIG. 6.

The circuit diagram of a control of the type of FIG. 6 is shown in FIG. 8. The batteries 18 are connected in series to provide equal positive and negative voltages on either side of ground. These voltages are applied by conductors 46 and 47 to the potentiometer resistors 27 in parallel, oriented to provide a positive voltage to the left hand end, as viewed outwardly from the center of the configuration, and a negative voltage to the right hand end of each of the resistors so that, upon rotation of the wheel or handle 24 in a clockwise direction, the sliding contacts 29' connected to the respective rods 29 provide increasingly negative voltages to the respective conductors 48, and, upon counterclockwise rotation, provide increasingly positive voltages thereto. The ungrounded input terminal 49 of each motor 19 may under some circumstances, be directly connected to a respective one of conductors 48. The motors are reversible and operate in one and the other direction in accord with the sign of the voltage so applied at a speed proportional to the voltage with respect to ground. While such direct connection is satisfactory for low horsepower motors, it is normally preferred to insert a respective speed controller 50 between each conductor 48 and the respective motor terminal 49. Such controllers, of any conventional type, are supplied with positive and negative voltages at their power input terminals 51, 52 by connection to conductors 47 and 46 and provide at their output terminals 53 voltages to the respective motor input terminals 49 of a sign and potential, with respect to ground, equal to, or proportional to, the input control voltages applied to their respective input control terminals 54. The controllers may also be of a feedback type or of special type used to control stepping motors. Their desirable property is the ability to set the speed of rotation of the motor proportional to the input voltage.

While the batteries 18 are shown as providing both control voltages to potentiometer resistors 27 and power voltages to the controllers 50, it will be apparent that a low voltage, low power source may be used in the control circuit and a separate higher power source may be used to supply power to the terminals 51 and 52 and, through the speed controllers 50, to the motors 19.

For a bumper car as contemplated in FIGS. 3, 4 and 5, it will be understood that each of the sliding contacts 29' of each of the potentiometer resistors 27 would be individually controlled by a respective one of the three control handles 16.

While the control of FIGS. 6 and 8, and the batteries 18, are shown and described as being carried by the vehicle of FIGS. 3, 4 and 5, it is possible to use the control of FIG. 6 as a remote control for an unmanned vehicle used as a toy or as a robot vehicle, for example. The conductors 48 of FIG. 8, together with a ground conductor, may then constitute a remote control cable, with separate power batteries being carried by the vehicle for supplying power to the controllers 50, or, if the controllers 50 are not required, as, for example, in a small toy vehicle, the conductors 48 may be directly connected to the motor terminals 49, power for the motors being supplied from batteries at the remote control station. It will further be apparent that uncoordinated remote control may be provided by omitting the assembly of arms 26, shaft 25 and wheel 24 as shown in FIG. 6, whereby each rod 29 may be manually controlled by a separate individual, the result being similar to that described in connection with the foregoing bumper car operation but with the additional complexity that, since the remote control will not now be oriented to correspond to the orientation of the toy vehicle (except when the vehicle happens to be in one particular rotative orientation) the result of moving any one slider by one of three operators becomes even less predictable. A game, in which teams of three compete in attempts to move the toy vehicle along a prescribed tortuous path, or into a specific preselected location, may be played with a toy vehicle so controlled.

Figure 9:
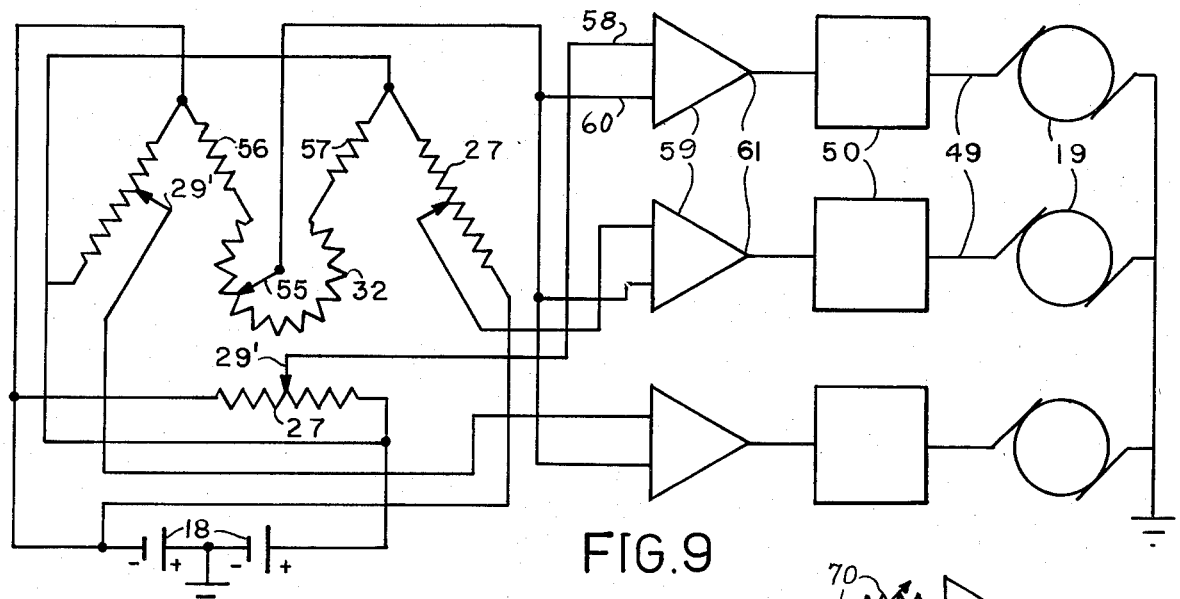
FIG. 9 is a schematic diagram of a control system applicable to the mechanism of FIG. 7.

FIG. 9 shows schematically a more sophisticated control, wherein three potentiometer resistors 27 are supplied with voltages from batteries 18 as above described, but wherein a fourth potentiometer resistance element 32 is provided, for which the sliding contact 55 may be controlled by the center wheel 23 of FIGS. 3 and 4 or the wheel 31 of FIG. 7. Resistance element 32 is connected across the conductors 46, 47, preferably through voltage reducing resistors 56 and 57 which limit the maximum rotational voltage which may be applied by the slider 55.

The sliders 29' are each connected, according to this embodiment, to one input terminal 58 of a respective electronic voltage adder 59 for each motor 19, and each adder is also connected, at a second input terminal 60, to slider 55, so that each adder provides to its respective output terminal 61 a resultant voltage which is the algebraic sum of the voltage on the respective slider 29' and the voltage on slider 55. The output terminals 61, in turn, are connected through respective speed controls 50 to the respective motor terminals 49. Power connections to the speed controllers such as shown at 51 and 52 in FIG. 8 are omitted in FIG. 9 for the sake of clarity. If the voltage and current capacities of the adders are sufficient, the speed controllers may be omitted.

It will be understood that each of the adders 59 may include adjustable input resistances in each input connection, a feedback resistor to control gain and power connections, while the controller 50 may, in each case, comprise a power transistor, all as known in the art.

Rotation of the wheel connected to the slider 55, which may be wheel 23 of FIGS. 3 and 4 or wheel 31 of FIG. 7, will, according to FIG. 9, add the same voltage component to the respective voltage component derived from the slider 29' for each motor. If the vehicle is traveling in a particular direction, due to a lateral displacement of the wheel, shaft and arms 26 from a centered position, rotation of the wheel about its axis will algebraically add the same voltage component to each motor thereby to cause the vehicle to rotate to right or left in addition to its translational movement, the action being similar to steering an automobile around a curve, and when thereafter the wheel is returned to its rotationally centered position, the vehicle again assumes its straight translational movement in the direction, with respect to the vehicle body, as determined by the extent and direction in which the arm assembly is laterally displaced. As a specific example, if the wheel and arm assembly of FIG. 7 are displaced to the right in a direction parallel to arm 38, which might be a sideways direction of the vehicle, the vehicle moves rectilinearly in this sideways direction. If the wheel 31 is now rotated to move the slider on resistor 32, the vehicle will turn as though rounding a curve because of the voltage component which is algebraically added equally to each motor, and upon return of the wheel 31 to its centered rotational position, the vehicle will again move in the direction parallel to arm 38, this being now a new compass direction across the surface but still the same sideways direction with respect to the vehicle body.

Figure 10:
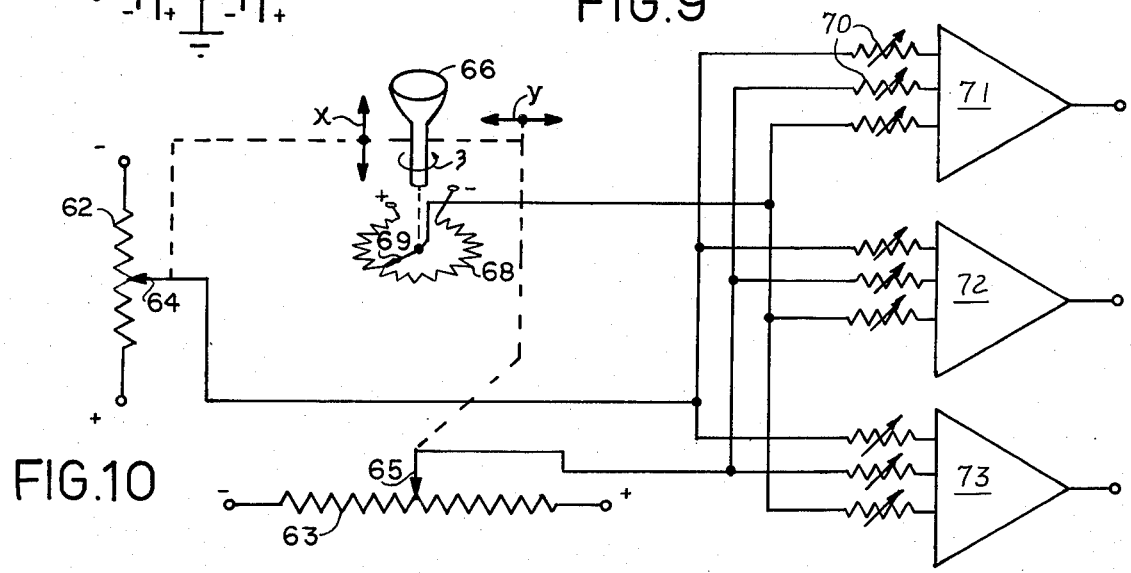
FIG. 10 is a schematic diagram of a control system embodying a potentiometric joy stick.

A further type of control system is shown schematically in FIG. 10 including two perpendicularly oriented resistors 62 and 63 provided with respective sliding contacts 64 and 65. The sliding contacts are connected to a universally transversely movable handle 66 which is also rotatable. The resistors 62 and 63 are provided at their opposite ends with plus and minus voltages with respect to ground as indicated, such as by a battery (not shown), having a grounded center tap. Movement of handle 66 along an x axis as indicated by the arrow x on the drawing correspondingly moves slider 64 along resistor 62 and movement along the perpendicular y axis indicated by the y arrow correspondingly moves slider 65 along resistor 63, whereby the voltages on the sliders represent the x and y coordinates of the position of handle 66 with respect to an $x=0$, $y=0$ centered or neutral position. A third resistance element 68, which may be arcuate as shown, is provided with a sliding contact 69 which may be coupled to the handle 66 to rotate therewith.

This resistor is connected across the battery, so that the slider voltage is continuously varied between a positive and a negative voltage with respect to ground in response to rotational adjustments of handle 66.

Displacement of contact 69 from a center neutral or $z=0$ position adds a rotational or z component to the x, y voltages which appear on sliders 64 and 65 and which cause linear translational movements of the vehicle.

The sliders 64, 65 and 69 are connected through respective adjustable resistors such as shown at 70, to each of three operational amplifier adders, 71, 72 and 73.

Type 741 operational amplifiers are suitable for this application.

Any movement or travel of the vehicle may be resolved into rectilinear and rotational components, and for any specific configuration of wheels and rollers as, for example, that of FIG. 5, any specific relative movement between vehicle and surface implies a specific speed and direction of rotation of each motor shaft, which, in turn, implies a specifice corresponding positive or negative voltage for each motor.

Figure 11:
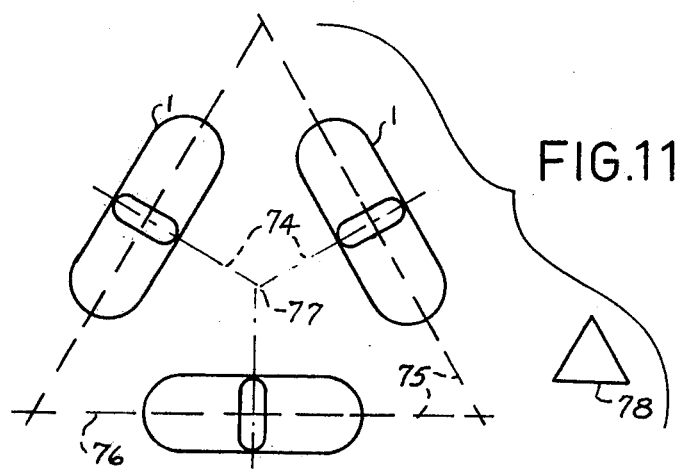
FIG. 11 is a schematic diagram of a vehicle according to the invention having wheels of the type of FIG. 1.

It will be apparent that for irregular wheel placement, that is, where the wheel axes do not meet at a point equidistant from the wheel centers, where the roller axes are not at 90 degrees to their respective wheel axes, or where the wheel axes are not 120 degrees to each other, or where the wheel axes do not meet at a single point, or for non-identical roller-axis-to-wheel-axis angles, controls must be appropriately compensated. For example, FIG. 11 shows schematically a regular configuration of wheels 1 (conforming to the arrangements in FIGS. 1,4 and 5) rotable on wheel axes 74 and with peripheral rollers 6 on axes 75 which, taken when the respective rollers are in bottom, ground-engaging position, are at right angles to the axes 74 of their respective wheels and which form an equilateral triangle 76 in a plane. The wheel axes 74, defining a finite triangle in another plane, meet at point 77 and are at 120 degrees to each other, and the centers of the wheels are equidistant from point 77. With this configuration, the potentiometer resistance elements 27 of FIGS. 6–9 would be disposed in equilateral triangular relation, as indicated at 78, with each resistor parallel to a respective roller axis.

Figure 12:
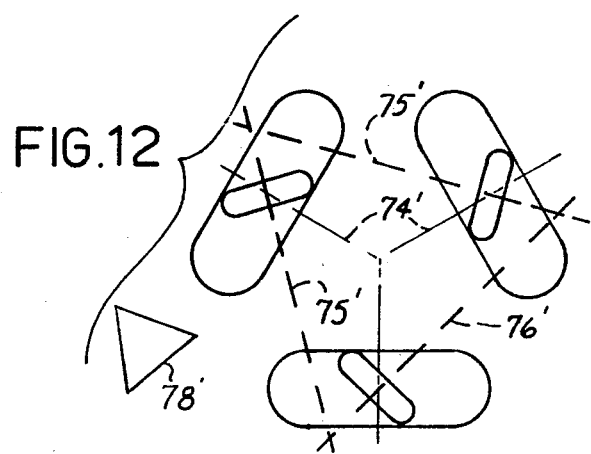
FIG. 12 is a schematic diagram similar to FIG. 1, the vehicle having wheels of the type of FIG. 2.

In FIG. 12, the wheels and rollers in accord with FIG. 2 are shown in equilateral triangular relationship with the roller axes 75' at 45 degrees, as measured counterclockwise from the respective wheel axes 74' to the respective roller axes 75', with respect to their respective wheel axes 74'. The roller axes form an equilateral triangle 76' and the appropriate orientation of the control resistors, of FIG. 6,7,8 or 9, for movement of the vehicle in the directions of displacement of the shaft 25 or wheel 31 for such drive wheel and roller configuration is in the equilateral triangular arrangement 78', with the resistance element in the speed control circuit for each drive wheel being parallel to the roller axis for that respective wheel.

Figure 13:
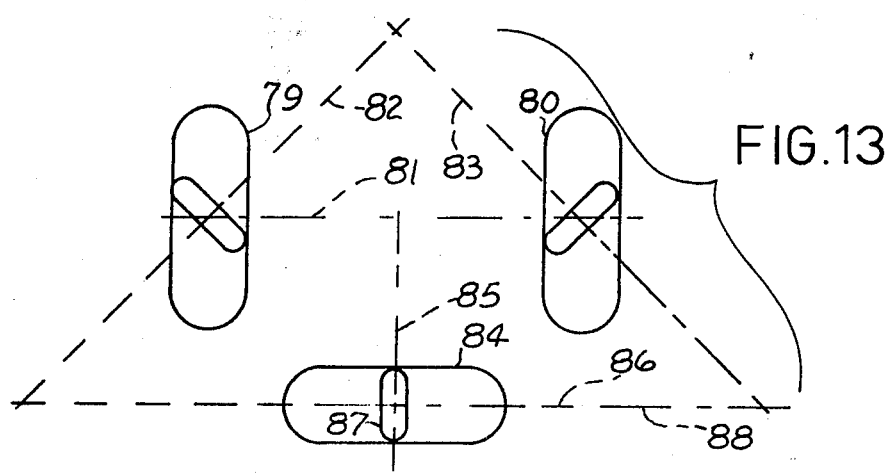
FIG. 13 is a schematic diagram similar to FIGS. 11 and 12, the vehicle having two wheels of the type of FIG. 2 and one wheel of the type of FIG. 1.

FIG. 13 shows a drive wheel and roller configuration in which two drive wheels 79 and 80 are coaxial, along axis 81, and have roller axes 82 and 83 offset by, for example, 45 degrees in respectively opposite directions from the wheel axis 81 and in which the third drive wheel 84 rotates on an axis 85 which is perpendicular to axis 81 and intersects it midway between wheels 79 and 80. The roller axis 86 for the rollers 87 of wheel 84 is perpendicular to the wheel axis 85 and intersects the roller axes 82 and 83 to form an isosceles triangle 88.

Figure 14:
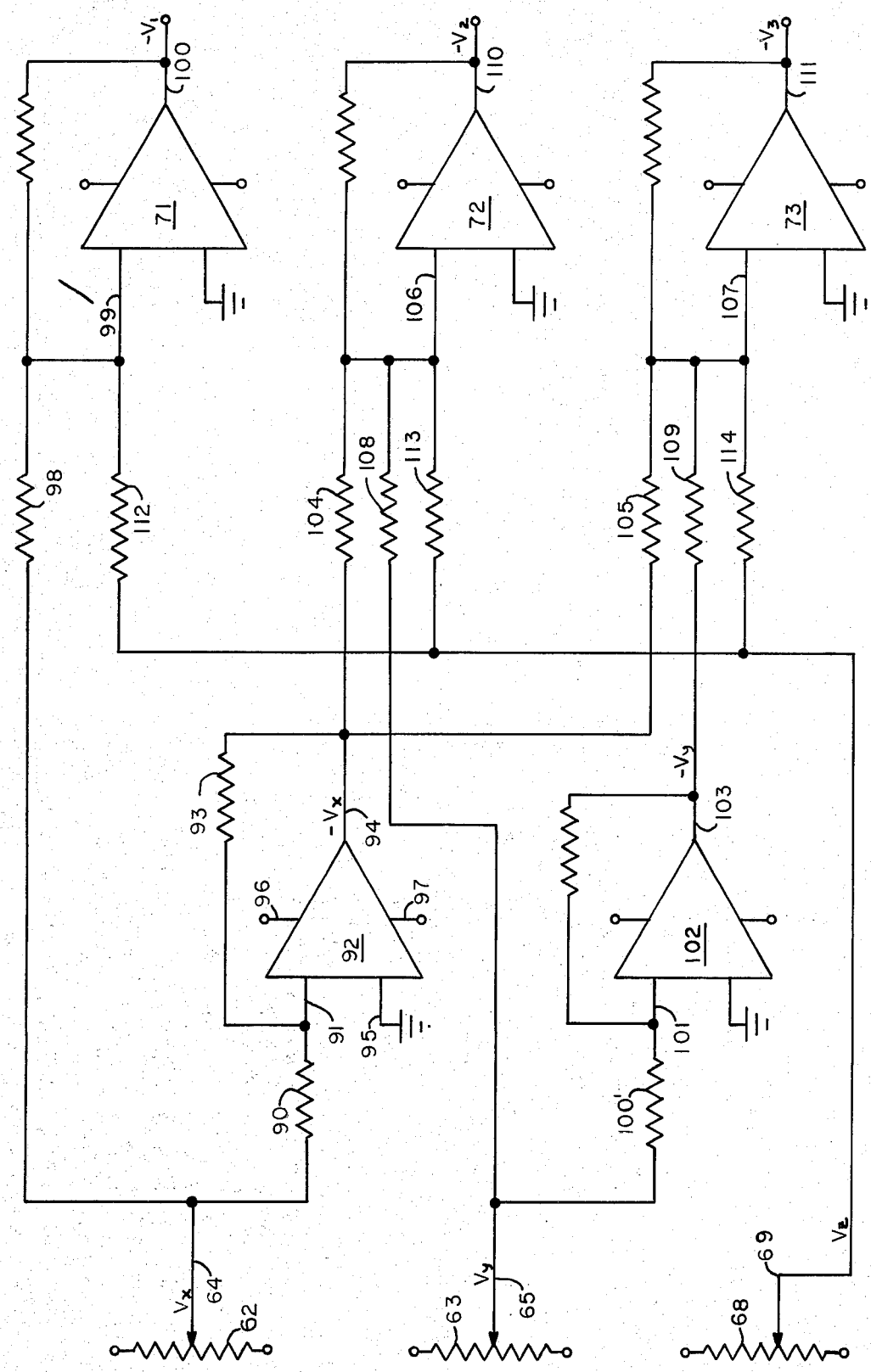
FIG. 14 is a detailed schematic diagram of a control system of the type of FIG. 10 with components selected to control a vehicle of the type of FIG. 11.

As a specific example, FIG. 14 shows the detailed schematic diagram of a control system of the type of FIG. 10 tailored to control a vehicle of the type shown in FIG. 11. In such a vehicle, the rotational speeds of the wheels are related to the motion of the vehicle by the following equations:

$$r\omega_1 = v_x + R\omega$$

$$r\omega_2 = -0.5v_x + 0.866v_y + R\omega$$

$$r\omega_3 = -0.5v_x - 0.866v_y + R\omega$$

where, using an orthonormal system of axes attached to the body and in the plane of the vehicle, the symbols are as follows:

$v_x$ and $v_y$ are respectively the x and y components of the translational velocity of the vehicle;

$\omega$ is the rate of rotation of the vehicle around its center;

$\omega_1$, $\omega_2$ and $\omega_3$ are the rates of rotation of the three wheels;

r is the radius of a wheel;

R is the distance from the center of the vehicle to the center of a wheel.

In this case, the wheels are of equal radius and equidistant from the center of the vehicle, so that r and R are of the same value for each drive wheel. The system of coordinates is chosen so that the origin lies at the center of the vehicle, the center of one of the drive wheels (which the subcript 1 designates) lies on the negative y axis, and the center of a second one of the drive wheels (designated by the subscript 2) lies in the first $+x,+y$ quadrant, and the center of the third one of the wheels (designated by the subscript 3) lies in the second $-x,+y$ quadrant.

If the x, y and z output voltages of the joystick control of FIG. 10, respectively $V_x$, $V_y$ and $V_z$ appearing on sliders 64, 65 and 69 respectively, have the same range, for example, $-5$, 0, $+5$ volts, a possible control scheme is to let the output voltages of the adders 71, 72, 73, $V_1$, $V_2$ and $V_3$ respectively, controlling the wheels be related to them as follows:

$$V_1 = V_x + 0.5V_z$$
$$V_2 = -0.5V_x + 0.866V_y + 0.5V_z$$
$$V_3 = -0.5V_x - 0.866V_y + 0.5V_z$$

In the complete diagram of FIG. 14, the slider 64 on resistor 62 is connected through resistor 90 to the negative terminal 91 of operational amplifier 92 connected as a unity gain inverter by means of feedback resistor 93 connected from output terminal 94 to terminal 91. The positive input terminal 95 of amplifier 92 is grounded, and the amplifier is supplied by a power supply (not shown) with 15 volts positive voltage at 96 and with 15 volts negative voltage at 97, as measured from ground. Amplifier 92 thus inverts the voltage $V_x$ as required to satisfy the appropriate algebraic derivation of the output voltages.

Slider 64 is further connected via resistor 98 to the negative terminal 99 of operational amplifier 71, on the output terminal 100 of which the voltage $V_1$ appears.

Slider 65 is connected through resistor 100' to the negative input terminal 101 of operational amplifier 102 operating as a unity gain inverter to provide $-V_y$ on its output terminal 103, as appropriate to the algebra.

Terminal 94 is connected via respective 200 Kohm resistors 104 and 105 to the respective negative input terminals 106 and 107 of amplifiers 72 and 73.

Slider 65 is additionally connected through resistor 108, of 115.5 Kohms, to terminal 106. Terminal 103, is connected through 115.5 Kohm resistor 109 to input terminal 107 of amplifier 73.

The output voltages $V_1$, $V_2$ and $V_3$ which with this circuit, are appropriate to provide translational movements of the vehicle will, thus, appear on output terminals 100, 110, and 111 of amplifiers 71, 72 and 73, respectively. While the voltages indicated on the drawing are negative, it will be understood that the directions in which the d.c. motors will rotate depend upon the polarity of the terminals and the indicated polarities are conventional.

In addition to the translational voltages, a rotational component is added to each from slider 69, the slider being connected through a respective 200 Kohm resistor 112, 113, 114 to each of input terminals 99, 106 and 107 respectively.

Each of operational amplifiers, 92,102,71,72 and 73 may be of type 741, the positive input terminal of each is grounded, as shown at 95 for amplifier 92, each is supplied with 15 volts positive and negative voltages from the power supply, as shown at 96 and 97 for amplifier 92, and each is provided with a 100 Kohm feedback resistor from its respective output terminal to its negative input terminal, such as is shown at 93 for amplifier 92. The resistors 62, 63 and 68 are each appropriately provided with positive and negative 5 volt potentials at their respective ends.

Resistors 90, 93, 98, and 100', and each of the feedback resistors around each operational amplifier, is of 100 Kohms.

While the circuit of FIG. 14 is designed for a regular wheel and roller configuration, the algebraic derivation of voltages for the three motors of irregular configurations can be similarly accomplished, so long as the roller axes form a triangle, so long as no roller axis is parallel to the axis of its respective drive wheel, and so long as at least one drive wheel axis is at an angle to each of the other drive wheel axes. Thus this circuit and type of control is readily adaptable to control, for example, vehicles having roller periphery wheels in the configurations of FIGS. 12 and 13, or of other configurations, even configurations in which no two drive wheels have roller axes at the same angle to the wheel axis, or in which the centers of two of the drive wheels are not equidistant from the intersection of their axes, or in which the three drive wheel axes do not meet at a common point.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A wheeled vehicle comprising a body, three wheels for supporting said body on a surface, each said wheel being attached to said body and rotatable about an axis fixed with respect to said body, each said wheel having a center point at which its said axis intersects the plane of the wheel, the centers of said wheels being disposed at the corners of a first finite triangle defining a first plane, each said wheel comprising a plurality of rollers disposed around its periphery for supportingly engaging said surface, said rollers having rotational axes oriented at a respective angle as measured counterclockwise from said respective wheel axis to said roller axis to the respective wheel axis for each said wheel as projected onto said first plane, said roller axes and said wheels being so oriented that, as taken for the roller of each wheel which is in lower dead center position in engagement with said surface, said roller axes define the sides of a second finite triangle defining a second plane, and means on said body connected to said wheels for driving each said wheel about its said axis.

2. The combination according to claim 1 wherein said angle for each said wheel is between about 30 degrees and 90 degrees.

3. The combination according to claim 1 wherein said angle for each said wheel is substantially 45 degrees.

4. The combination according to claim 1 wherein said angle for each said wheel is substantially 90 degrees.

5. The combination according to claim 1 wherein said angle for each said wheel is an acute angle measured in the same direction from the respective wheel axis.

6. The combination according to claim 1 wherein said angles for two of said wheels are acute angles greater than about 30 degrees and substantially less than 90 degrees and are measured in opposite directions from the respective axes of said two wheels.

7. The combination according to claim 6 wherein said acute angle for each of said two wheels is an angle of the same number of degrees.

8. The combination according to claim 7 wherein said angle for the third of said wheels is substantially 90 degrees.

9. The combination according to claim 8 wherein said vehicle is a wheel chair for carrying an invalid in a predetermined position on said body, wherein said two wheels are disposed on a common axis and on respectively opposite sides of said position, and wherein said third wheel is disposed rearwardly of said position on an axis perpendicular to said common axis.

10. The combination according to claim 1 wherein said wheel axes meet at a point.

11. The combination according to claim 1 wherein said second triangle is an equilateral triangle.

12. The combination according to claim 1 wherein said driving means comprises a respective individual separate drive means for each said wheel, and wherein a respective control means is provided for each such separate drive means for controlling the rate and direction of rotation of its respective said drive means.

13. The combination according to claim 1 wherein said drive means comprises a respective motor connected to each said wheel and wherein a respective speed control element is connected to each said motor to control the rate and direction of rotation thereof.

14. The combination according to claim 13 wherein a manual control member is connected to said speed control elements, wherein said elements are elongated and have axes forming a control triangle having the same corner angles as the corner angles of said second finite triangle, and wherein said control member comprises three unitarily movable arms respectively operatively coupled to said speed control elements.

15. The combination according to claim 14 wherein said triangles are equilateral triangles.

16. The combination according to claim 13 wherein each said speed control element comprises a respective potentiometer including a linear resistance element and a sliding contact in engagement therewith, wherein the resistance elements of said potentiometers are disposed along the sides of a triangle equiangular with respect to said second finite triangle, and wherein manual control means are coupled to said potentiometers for causing relative sliding movement between said sliding contacts and said resistance elements.

17. The combination according to claim 16 wherein said potentiometers and said control means are mounted on said body.

18. The combination according to claim 17 wherein said vehicle is a passenger carrying vehicle.

19. The combination according to claim 16 wherein said vehicle is a toy vehicle, wherein said speed control elements are disposed remote from said body, and wherein electrical conductive means connect said speed control elements to said driving means.

20. The combination according to claim 1 wherein control means are provided for said driving means for controlling the rate and direction of rotation of said driving means, said control means including an element having a centered position and being manually movable in lateral directions from such centered position, means controllably connected to said element for generating three signals respectively representing displacement of said element in three directions radiating from said centered position, wherein said driving means comprise a respective motor carried by said body drivingly connected to each said wheel, and means for applying each such signal to a respective said motor.

21. The combination according to claim 20 wherein said element is manually rotatable from a centered rotational position and wherein said signal generating means are responsive to rotational displacement of said element to add a signal component proportional to the rotative displacement of said element from such centered rotational position to each of said three signals.

22. The combination according to claim 20 wherein said means for generating comprises electrical means connected to said element for generating two voltages responsive to respectively perpendicular coordinates of the position of said element with respect to its said centered position and electronic means for converting said two voltages into said three signals.

23. The combination according to claim 22 wherein said element has freedom of movement in a third direction from a predetermined second centered position, means are provided for generating a third voltage responsive to displacement of said element in said third direction from said second centered position, and wherein said electronic means comprises means for adding a function of said third voltage to said three signals.

24. The combination according to claim 23 wherein said third direction is a direction of rotation of said element.

25. The combination according to claim 22 wherein said electrical means comprises two potentiometers comprising respective resistance elements oriented in the directions of said coordinates and a respective sliding contact engaged with each said resistance element, and means coupling said first element to said potentiometers for causing relative movement between said sliding contacts and said resistance elements.

26. The combination according to claim 25 and a third potentiometer comprising an arcuate resistance element and a sliding contact engaged therewith, means coupling said third potentiometer to said first element for causing relative movement between said sliding contact and resistance element thereof in response to rotational movements of said first element to generate a third voltage, said electronic means being connected to said sliding contact of said third potentiometer and comprising means for adding a function of said third voltage to each of said three signals.

27. The combination according to claim 20 wherein said element is manually rotatable, wherein means coupled to said element are provided for generating a fourth signal proportional to rotative displacement of said element from a predetermined position thereof and wherein means are provided for adding said fourth signal to each of said three signals.

28. The combination according to claim 1 wherein two of said wheels axes are at an oblique angle to each other.

29. The combination according to claim 28 wherein two of said wheels are spaced apart on the same axis and wherein the rollers on said two wheels have axes at the same acute angle of between about 30 and 60 degrees but measured in opposite directions from the axes of their respective said wheels.

30. The combination according to claim 1 wherein said driving means comprises a respective variable speed motor for driving each said wheel, wherein a manual control member is provided for manual movement along x and y axes from a centered position, means for generating two signals representing the x and y coordinates of the position of said member with respect to its said centered position, electronic means for generating three triangularly related vectoral signals from said two signals, and means for applying a respective one of said vectoral signals to each of said three motors.

31. The combination according to claim 30 wherein said manual control member is movable on a z axis, from a centered position on said z axis, wherein means are provided for generating a third signal representing the z coordinate of the position of said member from said centered position on said z axis, and means for supplying said third signal to said electronic means for addition to said vectoral signals.

32. The combination according to claim 31 wherein said control member is laterally movable with respect to said x and y axes and is rotationally moveable with respect to said z axis.

33. The combination according to claim 1 wherein said vehicle is a passenger carrying vehicle.

34. The combination according to claim 1 wherein said vehicle is a toy vehicle and wherein a manually operated electrical remote control assembly is provided connected by electrical transmitting means to said vehicle.

35. The combination according to claim 34 wherein said transmitting means comprise electrical conductors.

36. A vehicle comprising a body mounted on three spaced wheels disposed in a finite triangular relationship rotatable on axes defining a first plane and fixed to said body, one of said wheels having an axis of rotation at an angle to the axis of each of the other wheels, each wheel being provided with a plurality of supporting surface engaging rollers disposed around its periphery and connected thereto on respective roller axes, the axes of the rollers of said three wheels taken for a roller of each which is in engagement with said surface intersecting to form another finite triangle in a second plane, said axes of said wheels intersecting at a point located in the space between said wheels, said point when projected onto said second plane being within said other finite triangle.

37. The combination according to claim 36 wherein means are provided for driving said wheels, wherein manual control means are provided for said driving means comprising a unitary laterally movable assembly, three signal generating means coupled to said assembly for generating signals responsive to position of said assembly, said generating means being connected to control said driving means.

38. The combination according to claim 37 wherein said assembly is rotatable and said signal generating means are further responsive to the rotative position of said assembly.

39. The combination according to claim 37 wherein linkage means is connected to said assembly to restrict rotation thereof, wherein a manually rotatable control element is provided connected to an additional respective signal generating means for generating a rotational component signal, and means controllingly connecting said additional signal generating means to driving means.

40. An amusement bumper car for at least two persons comprising a body supported on three wheels rotatable on three angularly spaces axes defining a first plane, each wheel carrying a plurality of rollers peripherally therearound for supporting said wheels on a surface, said rollers having axes defining a second plane which are angularly spaced when projected from said second plane onto said first plane from the axis of the respective wheel, a respective drive motor for each said wheel mounted on said body, a manual control for one said motor adapted to be operated by one such person, and manual control means for the other two motors including a second manual control adapted to be operated by another such person.

41. The bumper car according to claim 40 wherein said manual control means comprises a respective manual control for each of said other two motors each adapted to be operated by a respective such other person.

* * * * *

UNITED STATES PATENT AND TRADEMARK OFFICE
CERTIFICATE OF CORRECTION

PATENT NO. : 4,237,990

DATED : December 9, 1980

INVENTOR(S) : Hau T. La

It is certified that error appears in the above-identified patent and that said Letters Patent are hereby corrected as shown below:

Col. 3, line 33, before "To" insert -- The angle between a roller axis and its respective wheel axis is commonly defined as being the angle of inclination between two skew lines that are not parallel and have no common point, namely as the angle between one of the lines (e.g. the roller axis), and the line through one of its points (e.g. the roller center) parallel to the other (e.g. the wheel axis). If the smaller of the two possible angle values is considered, the angle of inclination would range between 0 and 90°, rather than the aforementioned theoretical angle other than 0 or 180°.

Col. 11, line 56, cancel "defining"
line 57, cancel "a first plane"
line 61, cancel "as measured counter-"
line 62, cancel "clockwise...said roller"
line 63, cancel "axis"
line 63, before "to" insert -- of inclination --
line 63, cancel "as"
line 64, cancel "projected...plane"
line 65, after "that," insert -- when the vehicle is supported on a planar surface --
line 67, before "surface" insert -- planar --
line 67, after "surface" insert -- the projections of --
line 67, after "axes" insert -- onto said planar surface --
line 68, cancel "defining a second plane"

Signed and Sealed this

Sixteenth Day of February 1982

[SEAL]

Attest:

GERALD J. MOSSINGHOFF

Attesting Officer    Commissioner of Patents and Trademarks